Patented May 23, 1939

2,159,214

UNITED STATES PATENT OFFICE 2,159,214

DOUBLE SALT OF CALCIUM ASCORBATE AND CALCIUM ACETYLSALICYLATE AND PROCESS OF MAKING SAME

Samuel Klein, Newark, N. J.

No Drawing. Application May 19, 1938,
Serial No. 208,806

4 Claims. (Cl. 260—344)

My invention relates to pharmaceuticals and particularly to acetylsalicylic acid, commonly known as aspirin, which is widely recognized as a therapeutic agent. It is the object of my invention to prepare a pharmaceutical which will possess the therapeutic properties of acetysalicylic acid but in enhanced and potentiated form.

This object is attained by combining one or more of the vitamins with acetylsalicylic acid, or a salt or derivative thereof, the resulting product being a pharmaceutical which acts more effectively and quickly whenever the use of acetylsalicyclic acid is indicated. The combination may be either chemical or physical; in either case a pharmaceutical of greater value in chemotherapy is the result.

If it be desired to form a salt of the acetylsalicylic acid and the vitamin, chemical reaction is necessary, the result being a stabilized complex vitamin acetylsalicylate.

To illustrate how my invention may be attained, I shall describe one method of combining a vitamin, for example vitamin C, known also as ascorbic acid, with acetylsalicylic acid, thus forming a vitamin acetylsalicylate, or what may be termed a vitaminized acetylsalicylic acid.

First, calcium oxide is slaked with distilled water. Then the slaked calcium oxide is suspended in ethyl alcohol, and the mixture added to a mixture made up of half of acetylsalicylic acid and half of ascorbic acid until completely neutralized, thus forming a double salt which may be called calcium ascorbo-acetylsalicylate. The ethyl alcohol is then evaporated, preferably in a vacuum still, and the residue may be purified by recrystallization in vacuum. While I have found that good results are achieved by mixing equal proportions of acetylsalicylic acid and ascorbic acid before neutralization of the mixture by the slaked calcium oxide, it will be evident that other proportions of the acids will also produce the desired results. And, of course, other basic compounds besides slaked calcium oxide (calcium hydroxide) may also be employed.

The calcium ascorbo-acetylsalicylate thus prepared is a double salt, i. e., a combination of calcium ascorbate and calcium acetylsalicylate and is stable, white, odorless, crystalline salt, soluble in water and having a saline taste. It is very effective when ingested and combines the therapeutic properties of vitamin C and acetylsalicylic acid.

Medical authorities have found that people in normal health excrete in the urine some vitamin C, but if any abnormal or infectious condition exist no vitamin C is discovered in the urine. This has led to the conclusion that where the abnormal or infectious condition exists, the human body retains the vitamin C, which is normally excreted, to help in the correction of the abnormal or infectious condition. This being the case, and since the use of acetylsalicylic acid (aspirin) is indicated for the treatment of many ailments, the use of the calcium ascorbo-acetylsalicylate produced as shown above will replenish and add to the supply of vitamin C in the human body as well as supply the therapeutic properties of the aspirin.

In the case of a physical combination or mixture of acetylsalicylic acid or its salt and vitamin C or its salt, I have found advisable the mixing of one part of the vitamin to thirty-two parts of the acetylsalicylic acid. For example, one-half ounce of ascorbic acid and one pound of acetylsalicylic acid, thoroughly mixed and then formed into tablets or incorporated into a liquid mixture, provide a pharmaceutical with the desired therapeutic properties.

One course, the proportions will vary in accordance with the desired concentration of the vitamin. If more than one vitamin is to be employed, the vitamins are first mixed together in the desired proportions and then one part of this mixture combined with thirty-two parts of acetylsalicylic acid. For example, vitamin B or vitamin A is mixed with ascorbic acid (vitamin C) and then the mixture combined with acetylsalicylic acid in the desired proportions.

The use of the double salt, i. e., the combination of calcium ascorbate and calcium acetylsalicylate to form what may be termed calcium ascorbo-acetylsalicylate, results in benefits not secured by the use of either of these calcium salts or of the acids singly. In the first place, the use of the calcium salts is preferable because the salt of ascorbic acid is more stable than the acid itself. Then, too, the dosage of the acetylsalicylate is reduced from 25% to 50% of that heretofore found desirable, and this because of the use of the ascorbate. For example, calcium acetylsalicylate is usually administered in 8 grain doses, but if used in the form of the double salt of calcium acetylsalicylate and calcium ascorbate a 5 grain dose is just as effective as the 8 grain dose, and in addition there is the added advantage derived from the ingestion of the vitamin C salt. And the same holds true if a mixture of the acids is used: less acetylsalicylic acid is necessary if it is first mixed with a small amount of ascorbic acid.

It will be obvious that salts or derivatives of acetylsalicylic acid may be used and one or more of the vitamins or their salts or derivatives may be combined therewith physically or chemically without departing from the spirit of my invention. The scope of my invention, therefore, is not to be limited to the examples above-described where vitamin C is employed, for the invention may be carried out by a number of methods and with other vitamins, but solely by the following claims.

I claim:

1. The process of making a double salt of calcium acetylsalicylate and calcium ascorbate comprising slaking calcium oxide with water, suspending the slaked calcium oxide in ethyl alcohol, mixing acetylsalicylate acid with ascorbic acid and neutralizing said mixture with the slaked calcium oxide suspended in ethyl alcohol, and then evaporating the ethyl alcohol.

2. The process of making a double salt of calcium acetylsalicylate and calcium ascorbate comprising slaking calcium oxide with water, suspending the slaked calcium oxide in ethyl alcohol, mixing equal parts of acetylsalicylic acid and ascorbic acid, neutralizing said mixture of acids with the slaked calcium oxide suspended in ethyl alcohol and then evaporating the ethyl alcohol.

3. The process of making a double salt of calcium acetylsalicylate and calcium ascorbate comprising slaking calcium oxide with water, suspending the slaked calcium oxide in ethyl alcohol, mixing equal parts of acetylsalicylic acid and ascorbic acid and neutralizing said mixture of acids with the slaked calcium oxide suspended in ethyl alcohol, and then evaporating the ethyl alcohol in a vacuum still.

4. A pharmaceutical product comprising the double salt of calcium acetylsalicylate and calcium ascorbate.

SAMUEL KLEIN.